United States Patent
Molina et al.

(10) Patent No.: US 9,582,697 B2
(45) Date of Patent: Feb. 28, 2017

(54) SEQUENCED ILLUMINATION IN MARK READING DEVICES

(71) Applicant: SICPA HOLDING SA, Prilly (CH)

(72) Inventors: Aldric Molina, Albuquerque, NM (US); Nicola Duca, Monthey (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/894,058

(22) PCT Filed: May 28, 2013

(86) PCT No.: PCT/EP2013/060990
§ 371 (c)(1),
(2) Date: Nov. 25, 2015

(87) PCT Pub. No.: WO2014/191029
PCT Pub. Date: Dec. 4, 2014

(65) Prior Publication Data
US 2016/0110576 A1 Apr. 21, 2016

(51) Int. Cl.
*G06K 7/10* (2006.01)
*G06K 7/14* (2006.01)
*G06K 19/06* (2006.01)

(52) U.S. Cl.
CPC ..... *G06K 7/10732* (2013.01); *G06K 7/10722* (2013.01); *G06K 7/1413* (2013.01); *G06K 7/1417* (2013.01); *G06K 19/06103* (2013.01)

(58) Field of Classification Search
CPC ........... G06K 7/10732; G06K 7/10752; G06K 7/10821; G06K 7/10831; G06K 7/10841;
(Continued)

(56) References Cited

U.S. PATENT DOCUMENTS 3,473,027 A 10/1969 Freeman et al.
3,663,813 A 5/1972 Shaw
(Continued)

FOREIGN PATENT DOCUMENTS

EP 0 066 854 12/1982
EP 1 815 534 8/2011
WO 2006/054236 5/2006

*Primary Examiner* — Thien M Le
*Assistant Examiner* — April Taylor
(74) *Attorney, Agent, or Firm* — Greenblum & Bernstein, P.L.C.

(57) ABSTRACT

A reader operable to read a mark on a substrate, the reader comprising a power source, operable to deliver a variable drive current or voltage, a light source operable to illuminate said mark with a sequence of illumination light pulses of different wavelength spectra, an intensity of said illumination light pulses varying according to the delivered drive current or voltage, a light sensor operable to measure an intensity of light received from said mark and to deliver a corresponding light intensity signal, and a control unit operable to control said power source and light sensor to control timings of said illumination light pulses according to a switching pattern and timings to acquire said light intensity signal for synchronizing acquisition of said light intensity signal with said sequence of illumination light pulses, said control unit being further operable to adjust a duty cycle of said switching pattern so as to maintain heat generation associated to each illumination light pulse below a given threshold value.

26 Claims, 4 Drawing Sheets

(58) Field of Classification Search
CPC ...... G06K 7/12; G06K 7/1413; G06K 7/1417; G06K 7/10544; G06K 19/06103
See application file for complete search history.

(56) References Cited

U.S. PATENT DOCUMENTS

| | | | |
|---|---|---|---|
| 4,451,521 A | 5/1984 | Kaule et al. | |
| 4,451,530 A | 5/1984 | Kaule et al. | |
| 4,452,843 A | 6/1984 | Kaule et al. | |
| 4,533,244 A | 8/1985 | Kaule et al. | |
| 4,598,205 A | 7/1986 | Kaule et al. | |
| 5,608,225 A * | 3/1997 | Kamimura | G06K 7/12 250/271 |
| 6,996,252 B2 | 2/2006 | Reed et al. | |
| 7,125,143 B2 | 10/2006 | Hacker | |
| 7,213,757 B2 | 5/2007 | Jones et al. | |
| 7,427,030 B2 | 9/2008 | Jones et al. | |
| 8,220,713 B2 * | 7/2012 | Fazekas | G06K 7/10732 235/454 |
| 9,292,990 B2 * | 3/2016 | Blair | G07D 7/122 |
| 9,335,211 B2 * | 5/2016 | Vasic | G01N 21/6408 |
| 2002/0131618 A1 * | 9/2002 | Ahlers | G07D 7/122 382/101 |
| 2006/0202038 A1 | 9/2006 | Wang et al. | |
| 2009/0316393 A1 | 12/2009 | Vissenberg et al. | |
| 2010/0044440 A1 | 2/2010 | Wang et al. | |
| 2012/0181338 A1 | 7/2012 | Gao | |
| 2014/0097359 A1 * | 4/2014 | Vasic | G01N 21/6408 250/459.1 |

* cited by examiner

SEQUENCED ILLUMINATION IN MARK READING DEVICES

TECHNICAL FIELD

The present invention relates to readers operable to read a mark, such as readers and scanners for reading a security mark or a one- or two-dimensional barcode attached to some sort of substrate. The present invention also relates to methods of operating such devices, and corresponding computer programs and computer program products.

BACKGROUND

It is commonplace today to apply marks, such as one- or two dimensional bar codes, to objects, such as consumer products, food goods, beverage packs, cans and bottles, cigarette packages and other tobacco products, documents, certificates, money bills and the like. Marks can then serve the purpose of tracking, identifying, or authenticating the objects in the field, i.e. in the market, in a production or packaging line, at a retailer's place, during shipping, and the like.

Once a mark is applied to an object, the encoded information can then be later retrieved by means of mark (barcode) reading devices. Such devices usually first obtain said image data that was acquired using, for example, a digital camera. Other acquisition support may be provided by means of illumination devices, such as LEDs, lasers and other light sources. The reading devices may then employ processing resources, e.g. in the form of a microprocessor (CPU) and an associated memory, for processing the obtained image data. Usually, such processing involves isolating (identifying) the barcode in the image data and decoding the payload data. The decoded data can then be further processed, displayed, or transmitted to other entities.

Figure 1A:
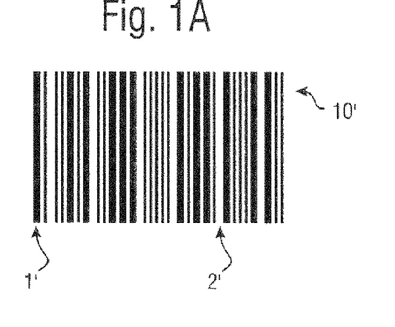
FIGS. 1A and 1B show schematic views of exemplary conventional bar codes.

Marks as such appear in various fashions, of which two examples are shown in FIGS. 1A and 1B: The common one-dimensional bar code 10' of FIG. 1A usually comprises an arrangement of elements as, for example, black and while lines 1', 2'. Information is encoded by concatenating predefined groups of black and white lines 1', 2' of varying thickness and distance. These groups are usually associated to a specific character or meaning by some kind of industry standard.

Figure 1B:
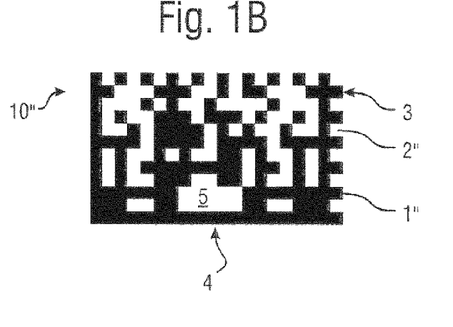

FIG. 1B shows a common two-dimensional bar code 10" that encodes information by means of arranging, in general terms, first type elements 1" and second type elements 2", such as rectangles, dots, triangles and the like, along two dimensions in some sort of ordered grid. The example of FIG. 1B follows an implementation according to the GS1 (Trademark) DataMatrix ECC 200 standard (GS1 being an international association providing standards for two-dimensional barcodes). This standard, for example, employs a so-called "L finder pattern" 4 (also called L-shape solid line, L-line, solid line, etc.) and a so-called "clock track" 3 (also called clock line, L-shape clock line etc.) surrounding the data 5 that carries the actual payload data of the bar code.

In both cases of one-dimensional and two-dimensional bar codes, at least two distinguishable types of elements are used. For example, a white-printed square as a first type element may represent the information 0, whereas a black-printed square as a second type element represents the information 1. In any way, however, implementations by means of black and white lines or dots (elements) represent just one example.

Specifically, the bar codes can be well implemented also by using color and/or fluorescent dyes or inks, thermo printing on heat-sensitive paper, mechanical means, such as milling, embossing, grinding, or physical/chemical means, such as laser etching, acid etching, etc. Any type of implementation is possible as long as the elements can be distinguished into their respective type in, for example, image data that has been obtained from the two-dimensional bar code being normally applied to some kind of object (good). For example, a digital camera can obtain digital image data of the bar code that is printed on a paper document or laser-etched on a metal can.

As such, luminescent materials as such are commonly used in security marks to be disposed on documents or articles (object), or in the bulk material of documents or articles, as an authenticity feature. A luminescent material typically converts energy of an exciting radiation of a given wavelength into emitted light having another wavelength. Luminescence emission used for authentication of a mark can lie in the spectrum range from ultraviolet (UV) light (below 400 nm), visible light (400-700 nm) or near to mid infrared light (NIR, MIR, IR) (700-2500 nm). In this context, a so-called "up-converter" material emits radiation at a shorter wavelength than the exciting radiation. By contrast, a "down-converter" material emits radiation at a longer wavelength than the exciting radiation. Most luminescent materials can be excited at more than one wavelength, and some luminescent materials can emit simultaneously at more than one wavelength.

Luminescence may be divided in the so-called "phosphorescence", which relates to time-delayed radiation emission observable after the excitation radiation is removed (typically, with a decay lifetime from above about 1 µs to about 100 s), and so-called "fluorescence", which relates to prompt radiation emission upon excitation (typically, with a decay lifetime below 1 µs).

Thus, a luminescent material used for a mark, upon illumination with excitation light within an excitation wavelength range, typically emits luminescence light within an emission wavelength range, which may differ from or overlap with said excitation wavelength range (depending on the material used). The characteristic spectral properties of a luminescent material such as its emission light intensity profile with time, or its characteristic decay time after excitation has stopped, for example, can be employed as a signature of this material and may thus be further used as an security feature for detecting genuineness or forgery (authenticity).

Luminescent materials can thus be ingredients of security inks or coatings. For example, the following patents disclose luminescent substances (which may include mixtures of pigments having distinct decay time properties) and security paper including such substances: EP 0 066 854 B1, U.S. Pat. Nos. 4,451,530, 4,452,843, 4,451,521. Processes and apparatuses for detecting luminescence light and authenticity of a marked item are also well known: see, for example, U.S. Pat. Nos. 4,598,205, or 4,533,244 (which disclose sensing decay behavior of luminescence emissions). Luminescent coded symbols are known from U.S. Pat. No. 3,473,027, and an optical reader for luminescent codes is disclosed in U.S. Pat. No. 3,663,813. The U.S. Pat. Nos. 6,996,252 B2, 7,213,757 B2 and 7,427,030 B2 disclose using two luminescent materials, having distinct decay time properties, for authenticating an item.

The great variety of possible implementations results also in widely varying optical properties of the mark. For example, barcodes can be printed using special inks, such as fluorescent or phosphorescent inks that emit light at different wavelengths (as compared to the wavelengths used for illumination) and/or with a delay. These specific characteristics of particular inks can be employed for authenticating a mark.

However, being able to detect specific characteristics of marks also requires proper illumination, so that the appropriate illumination wavelengths are available to which some mark responds. Usually, a high-intensity broadband light source is employed so as to ensure that sufficient intensity is provided in all wavelengths under consideration. Such prerogatives pose high demands on the corresponding light sources used for illuminating a mark, in that the emission power characteristics of a given light source are exploited to some maximum extent.

Such operation, however, may result in an increased or even impermissible generation of heat, so that additional means for cooling the light source may become necessary. Furthermore, light source operation close or even above the maximum power ratings can dramatically reduce the lifetime of the involved components. Once the light-source becomes too hot or has even degraded, also the corresponding reading device will fail, since proper illumination is no longer possible.

At the same time, it is nowadays common to use handheld or even wireless reading devices that only feature power sources of limited capacity (battery). In this way, also a short-term effect can be observed in that excessive power consumption by the light source results in an increased downtime of the device, during which batteries have to be replaced or charged, and, in turn, the device cannot be used. Further, any additional measures for cooling a light source in handheld devices are clearly not desirable, since they add to the device weight, size, and—again—power consumption.

Conventional light sources for such readers include incandescent lamps (typically for wavelengths between about 400 nm to about 2500 nm), flash lamps (like Xenon high-pressure flash lamp, for example), laser or Light-Emitting-Diodes (LEDs, emitting in the UV, visible or IR regions, typically for wavelengths from about 250 nm to about 1 micron). Conventional light sources are powered via a drive current (a LED for example) or via drive voltage (discharge lamps, for example). As an example, composite light sources with multi-LED modules (equipped with collimating and mixing structure) are disclosed in the US patent application US 2009/0316393 A1 (see also the U.S. Pat. No. 7,125,143 B2 and the European patent EP 1 815 534 B1).

In other words, the light source should deliver illumination to a mark so that the emission light intensity is sufficient for measurement operations. Due to the fact that only a part of the illumination light corresponds to a sub-bandwidth that is actually used for excitation, a problem of heat dissipation can arise for the light source. This may require controlling the heat within the light source to avoid damages to the source and/or lifecycle decrease. Such techniques include, for example, a specific design of the LEDs themselves and/or their arrangement on adapted substrates, and also cooling systems.

Therefore, there is a need for an improved mark reader devices that avoids overheating of the light source, maximizes the life span of the light source and the mark device as a whole, and reduces the overall size, weight, and power consumption.

SUMMARY

The above mentioned problems are solved by the subject-matter of the independent claims of the present invention. Preferred embodiments are described in the dependent claims.

According to one embodiment of the present invention, a reader operable to read a mark on a substrate is provided, the reader comprising a power source, operable to deliver a variable drive current or voltage, a light source operable to illuminate said mark with a sequence of illumination light pulses of different wavelength spectra, an intensity of said illumination light pulses varying according to the delivered drive current or voltage, a light sensor operable to measure an intensity of light received from said mark and to deliver a corresponding light intensity signal, and a control unit operable to control said power source and light sensor to control timings of said illumination light pulses according to a switching pattern and timings to acquire said light intensity signal for synchronizing acquisition of said light intensity signal with said sequence of illumination light pulses, said control unit being further operable to adjust a duty cycle of said switching pattern so as to maintain heat generation associated to each illumination light pulse below a given threshold value.

According to another embodiment of the present invention, a method of operating a reader operable to read a mark on a substrate, the reader comprising a power source, operable to deliver a variable drive current or voltage, a light source operable to illuminate said mark with a sequence of illumination light pulses of different wavelength spectra, an intensity of said illumination light pulses varying according to the delivered drive current or voltage, a light sensor operable to measure an intensity of light received from said mark and to deliver a corresponding light intensity signal, said method comprising controlling timings of said illumination light pulses according to a switching pattern and timings to acquire said light intensity signal for synchronizing acquisition of said light intensity signal with said sequence of illumination light pulses, and adjusting a duty cycle of said switching pattern so as to maintain heat generation associated to each illumination light pulse below a given threshold value.

According to further embodiments of the present invention, there are provided a computer program that comprises code, which, when executed on a processing resource, implements a method embodiment of the present invention, and a corresponding computer program product.

BRIEF DESCRIPTION OF THE DRAWINGS

Embodiments of the present invention, which are presented for better understanding the inventive concepts but which are not be seen as limiting the invention, will now be described with reference to the Figures in which.

DETAILED DESCRIPTION

Figure 2A:
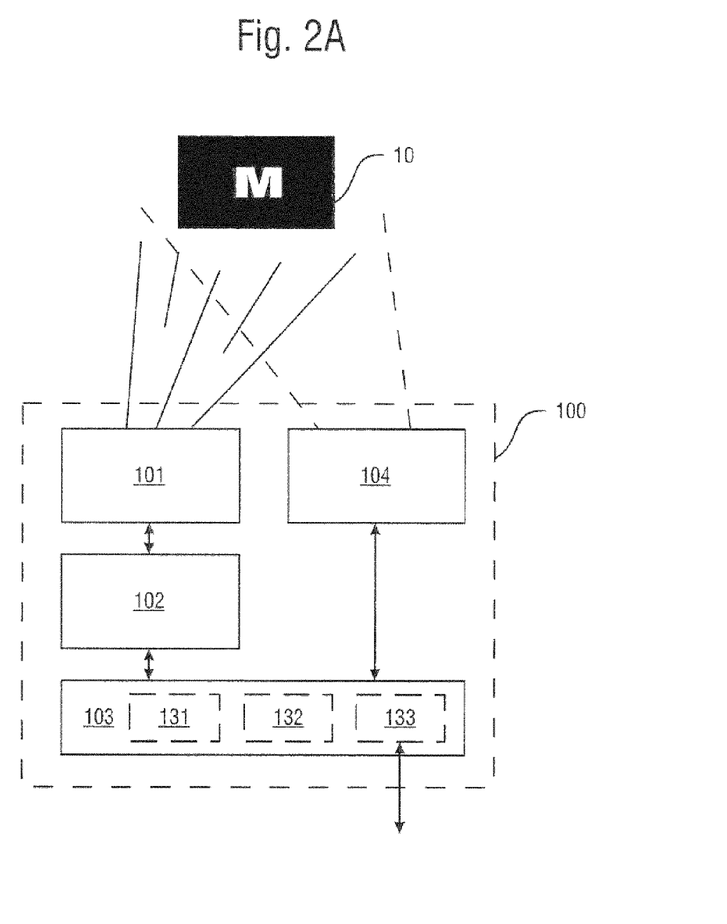
FIGS. 2A to 2C show schematic views of mark reader devices according to further embodiments of the present invention.

FIG. 2A shows a schematic view of a device embodiment of the present invention. A device 100 (e.g. a barcode or mark reader) comprises a power source 102, operable to deliver a variable drive current or voltage, and a light source 101 operable to illuminate a mark 10 with a sequence of illumination light pulses of different wavelength spectra, an intensity of said illumination light pulses varying according to the delivered drive current or voltage. Device 100 also comprises a light sensor 104 operable to measure an intensity of light received from the mark 10 and to deliver a corresponding light intensity signal.

Device 100 also comprises a control unit 103, for example in turn comprising a microprocessor (CPU) 131 and a memory unit 132. The control unit 103 is operable to control said power source 102 and light sensor 104 to control timings of said illumination light pulses according to a switching pattern and timings to acquire said light intensity signal for synchronizing acquisition of said light intensity signal with said sequence of illumination light pulses. Control unit 103 is further operable to adjust a duty cycle of said switching pattern so as to maintain heat generation associated to each illumination light pulse below a given threshold value.

For example, a first light pulse is of light of a first wavelength spectrum and a second light pulse is of light of a second wavelength spectrum, wherein the second wavelength spectrum is different from said first wavelength spectrum. The fact that said spectra are "different" is to be understood in the context of the present disclosure in the sense that the spectra comprise at least one local maxima in the emission intensity that are located at different light wavelengths. In this way, two spectra are different although the spectra may feature overlapping regions in which in both spectra light intensity at some given wavelengths is non-zero or even comparable or identical. In general, also the timings can be "different" in the sense that there is at least one point in time when there is illumination with of only one of the two wavelength spectra. Preferably, two wavelength spectra are used at different timings so that there is illumination only with one spectrum at a time.

As a further option, the control unit 103 may comprise a communication unit 133 for communicating instructions relating to the control of the emission of the light source 101. Said instructions may be received from other entities, such as servers, controllers and the like. The communication may be effected over a network, such as a local area network (LAN), wireless network (WLAN), the internet, and the like. Further, also bus systems, such as CAN, can be employed for data exchange.

Further, the device 100 may optionally also comprise as the light sensor 104 integrated image acquisition means for acquiring image data of the mark (likely including also a surrounding, such as a substrate in form of an object, product, or item to which a mark is applied). In general, the light sensor and/or the image acquisition means may comprise or may be composed of one or more photodiode(s) (single or arrays), one or more phototransistor(s) or photoresistance circuits, linear CMOS or CCD sensors, acquisition optics (lenses etc.), and the like.

The image acquisition means 104 may be coupled to the control unit 103 for the purpose that the exemplary CPU 131 processed the acquired image data for identifying and/or decoding the mark, e.g. in the form of a one- or two-dimensional barcode. In such embodiments, the optional communication unit 133 may be employed for communicating an identification, decoding and/or authentication result to the aforementioned other entities.

Figure 2B:
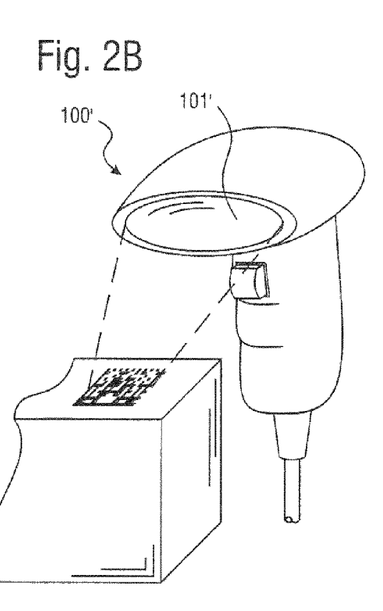

FIG. 2B shows a schematic view of a further embodiment of the present invention in the form of a handheld mark reader (scanner) 100'. For example, device 100' is configured to take an image of a mark on a product or item, and to identify and decode the same. Device 100' comprises a window 101' through which a mark can be illuminated according to the embodiments of the present invention and a digital image of can be acquired. Specifically, device 100' comprises again a light source along embodiments of the present invention. Through window 101' also an image can be acquired by respective means integrated in device 100'.

Although a window 101' is shown as a useful means for protecting a light source, light sensor, and/or any imaging means—for example from dust, water or humidity—this window 101' is optional, since the light source itself may already feature some kind of housing that provides sufficient protection from the environment. For the purpose of controlling the light source and—optionally—also processing any acquired image data for decoding/authenticating, device 100' may comprise integrated processing resources configured to operate along embodiments of the present invention.

Figure 2C:
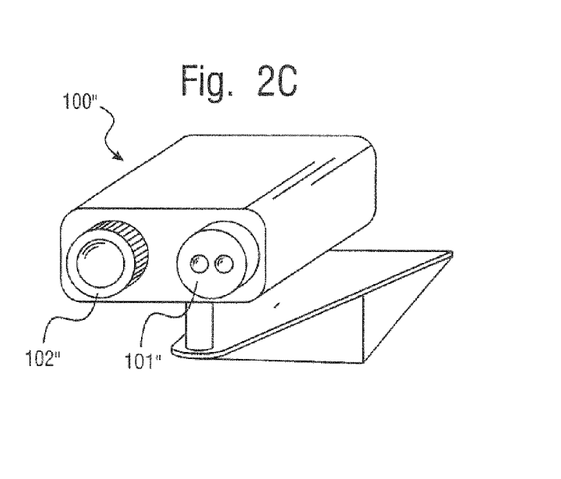

FIG. 2C shows a schematic view of a fixed type mark reader according to another embodiment of the present invention. Device 100" comprises a light source 101" along embodiments of the present invention. At the same time, device 100" may comprise image acquisition means 102" for imaging a mark that is/was illuminated with said light source 101". The shown embodiment considers camera-type image acquisition means 102", for example in the form of a CCD-camera (although also related technologies may be employed such as the ones described in conjunction with means 104). For the purpose of controlling the light source and—optionally—also processing any acquired image data for decoding/authenticating, also device 100" may comprise integrated processing resources configured to operate along embodiments of the present invention.

As further options, devices 100' and 100" may comprise a communication unit for communicating instructions relating to the control of the emission of the light source, or identification, decoding and/or authentication from and/or to the aforementioned other entities. Although device 100' is shown with a wire, communication may be effected in a wireless fashion over any type of suitable network, such as a local area network (LAN), wireless network (WLAN), the internet, and the like. Further, also bus systems, such as CAN, can be employed for data exchange. Also, a power module for supplying the reader with power, a radio module for wireless communication (over Wi-Fi for example), a display module (a liquid crystal display LCD, or kinescope display, for example) for displaying measured data or scanning parameters (decoding/authentication results), and a controlling interface for inputting scan conditions (including buttons having multiple functions and an ON/OFF switch button) can be considered.

In a way, embodiments of the present invention relate to optical devices for reading and/or decoding marks with patterns (barcode, datamatrix, etc.) applied to some kind of object or substrate. It is to be understood that in the context of the present disclosure the terms object, items, and product denote the same entity, namely the object to which a mark is applied. For example, luminescent patterns and marks, i.e. having decay time characteristics of luminescence light emitted by a luminescent material forming the pattern, and non-luminescent patterns imaged from light reflected by the pattern can be read.

Embodiments of the present invention thus provide imaging bar code reader (mark reader) for example also capable of taking images of moving products on a high speed production line and illuminating the target product marks with different types of illumination (e.g. different colors of light) by means of a composite light source. The illumination flash can be synchronized with the opening of the image aperture of the employed image acquisition means. The illumination type, illumination intensity and exposure time are programmable so that the reader is able to scan many different types of marks under varying environment conditions (e.g. ambient light intensity or type), where different illumination is required, while preventing excessive heating of the light source. In this way, also a handheld version (cf. for example device 100' of FIG. 2B) of the scanner can be considered in an advantageous manner.

According to embodiments of the present invention, an illumination light source delivers illumination light pulse components, each light pulse component having its wavelength distribution (spectrum) within a wavelength sub-range of the overall wavelength range of the light source, the light pulse components being delivered by the light source according to an illumination sequence (i.e. according to a switching on/off timing of the pulse components).

As a consequence, the light source is suitable for delivering high illumination intensity to a target mark while avoiding excessive dissipation of power as heat, which could damage the light source and reduce its life cycle. Moreover, a given (standardized) light source may be adapted to various mark types by selecting the pulse components (spectra) and their timings (possibly, light pulse components may overlap in time and/or may be repeated during overall illumination cycle). Possibly, an intensity of the light delivered by a light pulse component may be set, as well as the pulse duration and the sequence of the light pulse components forming the global illumination light (in the sense of varying the intensity profile of one spectrum as a whole by, for example, a scaling factor).

A light sensor adapted to a mark type may receive light from the mark, in response to illumination by the light source, and may collect light in synchronization with the illumination sequence so as to measure only light intensity (over a measuring time sequence) mainly due to some specific illumination light pulse component(s) of the illumination sequence. Thus, a setting of the illumination sequence delivered by the light source and associated measuring of light intensity operation by the light sensor, allows easily adapting high intensity light illumination and light detection operations to various mark types (having specific light reflection and/or light emission properties), while avoiding damages due to excessive power dissipation in the light source.

In a further embodiment of the present invention, the devices are configured to read, decode and/or authenticate a mark that can comprise a luminescent material on the basis of the luminescence light emitted by said material (having decay-time characteristics) in response to illumination with a specific sequence from the light source. Such a "decay-time scanner" would comprise an illumination light source along the present disclosure for delivering excitation light to a luminescent mark, and a luminescence light sensor for measuring emission light intensity received from the mark in response to excitation light.

In general, a flash illumination light source has an illumination light wavelength distribution within a wavelength spectral bandwidth WS=[$\lambda$min, $\lambda$max] (with $\Delta\lambda S=\lambda$max−$\lambda$min) and can be suitable for illuminating a mark that includes some sort of luminescent particles with a high intensity excitation light pulse during a target illumination period T (i.e. a pulse duration). A luminescence light sensor is then operable to receive decaying luminescence light intensity (emitted from the mark, after its luminescent particles have been excited by the illumination source) over a measuring time $\Delta t$ of about 100 μs (e.g. camera integration time) after illumination has stopped. Typically, one has T being approximately in the range or order of $\Delta t$ (i.e. T~$\Delta t$).

The mark can comprise a luminescent particle type i of which decay-time value is $\tau i$. The luminescent particles of type i in the mark, emit luminescence light in a narrow luminescence bandwidth $\delta i$ centered on luminescence emission wavelength $\lambda(i)$, after having being excited by corresponding excitation light component of the excitation light pulse delivered by the light source, of which excitation wavelength sub-bandwidth is comprised within WS. Typically, one can assume $\Delta t \gg \tau i$.

According to an embodiment of the present invention, the light source is a composite light source, i.e. the illumination light source comprises a plurality of distinct illumination light sources S(j), j=1, . . . , N. For example, individual light emitting diodes (LEDs) can be disposed on a support. Each individual light source component can then be made operable to deliver a corresponding excitation light pulse component having its own intensity profile Ij(t) (over time), duration T(j) (comprised within T) and wavelength bandwidth (i.e. illumination wavelength spectrum within said wavelength bandwidth).

The overall illumination light pulse delivered by the light source (corresponding to a given color) is thus composed of a plurality (possibly, partially overlapping in wavelength) excitation light pulse components j of wavelength bandwidths [$\lambda$jmin, $\lambda$jmax] around wavelength $\lambda$j (corresponding to distinct colors), with respective spectral widths $\Delta\lambda j=\lambda$jmax−$\lambda$jmin, each being comprised within [$\lambda$min, $\lambda$max].

Furthermore, some distinct excitation light pulse components may be delivered either simultaneously or at different instants and timings (possibly, a time delay between pulse components may be set) within the illumination period T, and may even partially overlap in time. For example, a composite light source may deliver the various excitation light pulse components (time pulses) through a switching sequence of a control unit being configured to switch on/off the individual light source components j according to a set timing, so as to produce the excitation light pulses having their characteristic values Ij(t), T(j) and spectral distribution, and, in turn, so as to deliver sequence for illuminating a mark.

The timely delivered excitation light pulse components may thus form some kind of broadband illumination light delivered by the light source, since, although each composite light source only provides some spectral contribution, the sequence of more than one illumination wavelength spectrum can compile a more or less broadband spectrum. For example, a sequence of a red light pulse, a green light pulse, and a blue light pulse may compile to a composite white light broadband light pulse.

When using such a composite light source as described above, the luminescence light sensor (image acquisition means) can be accordingly adapted to timely measure emission light intensity from at least one type i of luminescent particles of the mark, of which emission light results from excitation by at least one excitation light pulse component delivered by the light source.

According to a further embodiment, each illumination light pulse I can be set so as to excite a corresponding luminescent particle type i present in a mark. The luminescence light sensor (image acquisitions means) may then be adapted to measure distinct luminescence emission light components i emitted by luminescent particles of corresponding type i. This can involve a specific emission sequence resulting from the illumination sequence with the excitation light pulse components. For example, the luminescence sensor can be a composite one, comprising different luminescence sensors more specifically adapted and controlled so as to measure the emission intensities of the different type of luminescent particles of the mark. For example, each individual component sensor has designed detection characteristics for the respective wavelength spectrum.

According to embodiments of the present invention, a reader can be equipped with effectively a broadband illumination light source that is operable to measure an intensity I (i) of a luminescence light emitted by luminescent particles of type i in the mark, in a narrow luminescence bandwidth δi centered on luminescence emission wavelength λ(i), in response to a high intensity illumination light pulse delivered by the light source during a period T to the mark, said luminescence emission light component (i) being in fact the response of the mark to at least one excitation light pulse component, of wavelength sub-bandwidth, within the broadband illumination light.

A classical decaying intensity curve of luminescence light (intensity profile with time) from a luminescent material can be modeled by an exponential law $I(t)=I0 \exp(-\alpha[t-t0])$, wherein time t is counted from instant t0 at which excitation light is removed. A pulsed light source illuminates the luminescent material of a mark with an excitation light of a given intensity and in an excitation wavelength range only during an excitation time interval, then, possibly with a time delay after the illumination has stopped, the light sensor images the mark from received decaying luminescence light intensity in an emission wavelength range over a measuring time interval, and the corresponding digital image can be stored in a memory for further image processing (decoding/authenticating). It is possible to set the excitation time interval and/or the time delay so as to avoid problems with a value of luminescence intensity below a detection threshold value of the light sensor or above its saturation threshold value.

According to one embodiment of the present invention, a light source comprises a plurality of (an array of) chip-on-board LEDs (COB LEDs) units bonded on an aluminum PCB, each COB LED unit comprising a group of three LEDs: a red light emitting diode (R LED), a green light emitting diode (G LED) and a blue light emitting diode (B LED), a collimation optic for the unit. The COB LED units are connected to a circuitry which allows a controller to switch power independently to the R, G and B LEDs of the array. In this way a light source is obtained comprising a plurality of individual component light sources that are operable to emit at least a first light pulse and a second light pulse having, respectively, a first wavelength spectrum and a second wavelength spectrum.

Figure 3:
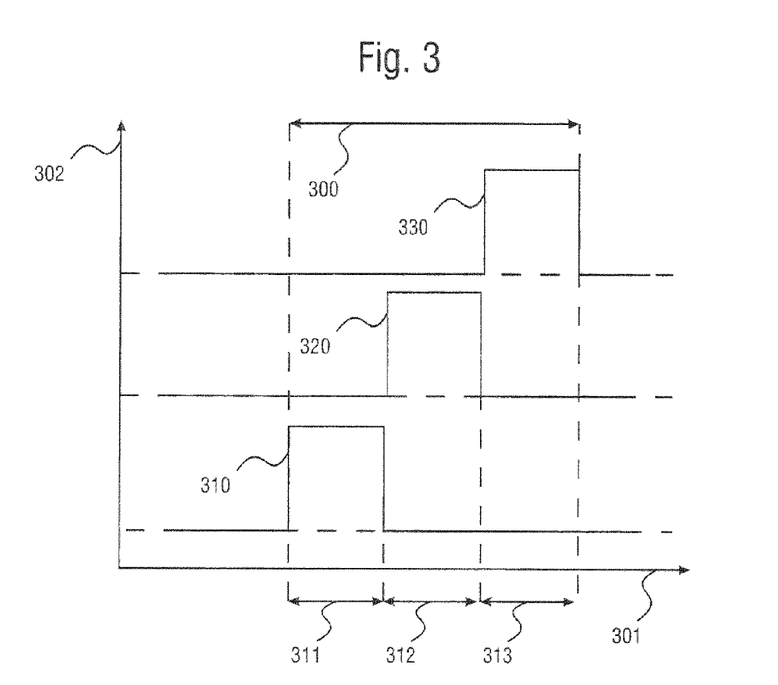
FIG. 3 show a schematic graph of pulse intensities versus time for a given plurality of component light sources according to an embodiment of the present invention.

Such a light source is operable to illuminate a mark substantially uniformly with high light intensity R, G, B light pulses, according to a given switching time sequence. These R, G, B light pulses forming the illumination light pulse components of a global illumination light pulse delivered by the light source during an illumination time interval T. For example, in case of a luminescent material being excited by light in the near-infrared (NIR) part (i.e. 680-1000 nm) of the wavelength range of the R illumination light pulse, a typical duration T(R) of the R illumination light pulse component may be of about 100 μs. An example of illumination sequence may be composed of merely three consecutive illumination pulses: one R pulse (duration T(R), intensity level I(R)), one G pulse (duration T(G), intensity level I(G)) and one B pulse (duration T(B), intensity level I(B)) (see FIG. 2), with, for example, T(R)=T(G)=T(B)~100 μs (we have T(R)+T(G)+T(B)=T~300 μs). T(R) and I(R) being sufficient for "charging" enough the luminescent particles of the mark in order to receive sufficient luminescence emission intensity from the mark.

Once the first R illumination pulse, being the excitation pulse for the luminescent material, has been delivered, a light sensor of an imaging unit (image acquisition means, camera) of the reader can start receiving (through an adapted optical block) luminescence emission light from the mark. The light sensor integrates the received emission light intensity signal over a measuring time interval Δt, in this example Δt is of about 100 μs. In this way, imaging means have acquired a digital image of the mark in the form of image data.

According to further embodiments of the invention, one of the following parameters may be set or adjusted: pulse component duration, pulse component intensity level, pulse component time start time and measuring time interval (image acquisition interval). Also, switch on/switch off timings of the LEDs as component light sources may be further set to accomplish a switching time sequence, and thus the illumination sequence by the pulse components.

FIG. 3 shows a schematic graph of such a sequence of exemplary three light pulses. Light intensity 302 is drawn versus time 301 for a red light pulse 310, a green light pulse 320, an a blue light pulse 330, with respective pulse times T(R) 311, T(G) 312, and T(B) 313. The overall pulse in the sequence has a time T 300.

Figure 4:
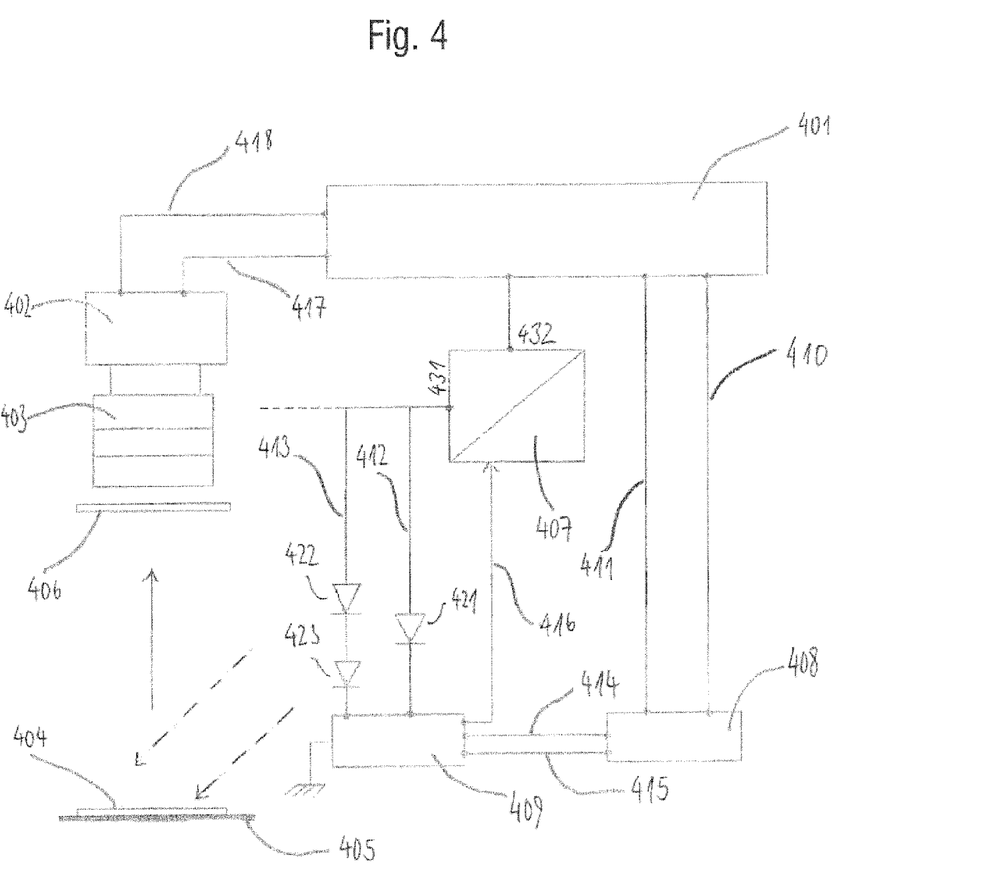
FIG. 4 shows a schematic view of a circuitry of a mark reader device according to a further embodiment of the present invention.

A scanner/reader setup according another embodiment is shown in FIG. 4. A controller 401 controls a camera 402 (imaging acquisition means including some suitable type of light/image sensor) equipped with an optical block 403 that in turn may include some sort of lens or optical system. Camera 402 can receive light from a mark 404 applied to a substrate/object 405, and focusing the received light on the light sensor in the camera. An optical filter 406 may be added to filter light received from the mark 404, for narrowing the wavelength band sent to the light sensor 402.

The illumination light source is operable to illuminate the mark 404 with illumination pulsed light having red, green and blue illumination light pulse components respectively delivered by red LED 421, green LED 422, and blue LED 423. After having being excited by the red light pulse component emitted by LED(s) 421 of the red type ("R") of the light source, some (datamatrix/barcode) pattern forming the mark 404 printed with luminescent ink on the substrate 405 emits luminescence light and is then imaged by the camera 402 through the filter 406 and the optical block 403.

According to this embodiment, the light source (or a corresponding control unit) comprises a switched-mode power supply 407 (SMPS, or Switching power supply), which may be a step-down converter or a step-up converter, depending on whether its output voltage is respectively lower or higher than its input voltage; the SMPS 407 is connected to the controller 401 for receiving input voltage Vi 432 (fixed value), and is operable to deliver a constant output voltage Vo 431 to a circuit comprising the LEDs (for example, Vi is 24 V and Vo is 48 V). A further controller 408 controls the illumination sequence of the LEDs 421-423 and is operable to receive synchronization signal from the controller 401 through a synchronization connection 410, for setting illumination by the LEDs and acquisition by the camera 402 (via a signal through connection 411 for controlling emission of light pulses by the LEDs). The further controller 408 controls the drive current delivered in each one of the branches 412 and 413. Typically, the further controller 408 uses PWM (Pulse-width Modulation) for creating the control signal for the illumination sequence.

The R, G and B LEDs 421-423 are disposed on two branches 412, 413 as an illustration example, and receive the output voltage signal Vo 431 from the SMPS 407, each branch 412 and 413 being connected to a grounded drive current control loo 409 operable to make drive current flowing through the branches according to control signals send by the further controller 408 through connections 414 and 415, respectively. Thus, the drive currents in each one of the branches 412 and 413 may be controlled separately. The drive current control loop 409 is further operable to dissipate power resulting from voltage drop and drive current in the branches. Moreover, the drive current control loop 409 has a connection 416 with the SMPS 407 to send setting signals for setting a (constant) value of the output voltage Vo 431 so as to deliver appropriate level of drive current in the branches, in order to avoid excess of heat production by the LEDs, while illumination with sufficient light intensity.

The camera 402 is connected to the controller 401 via an Ethernet link 418 for receiving camera setting signals, and a high-speed link 417 for receiving set point signal (on/off) from the controller 401 and delivering digital images to the controller unit 401 for image processing (and further datamatrix/barcode decoding in a programmed CPU unit of the controller). The camera 402 is thus operable to receive a set point signal from the controller 401 to open its shutter to acquire an image (image data) of the mark 404, and simultaneously send a synchronization signal to the controller 401 to initialize control of the illumination light pulse to be delivered by the light source—this signal being transmitted by the controller to the further controller of the light source.

Figure 5A:
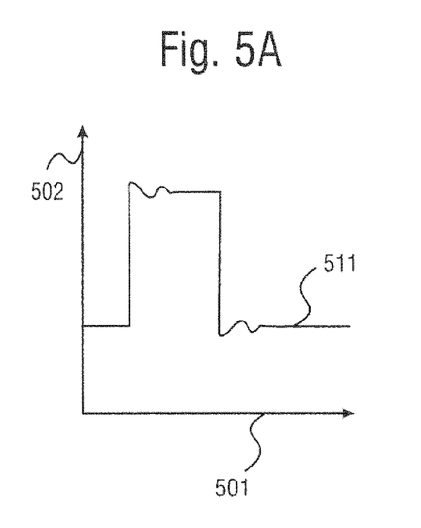
FIGS. 5A and 5B show schematic graphs current pulses versus time.
Figure 5B:
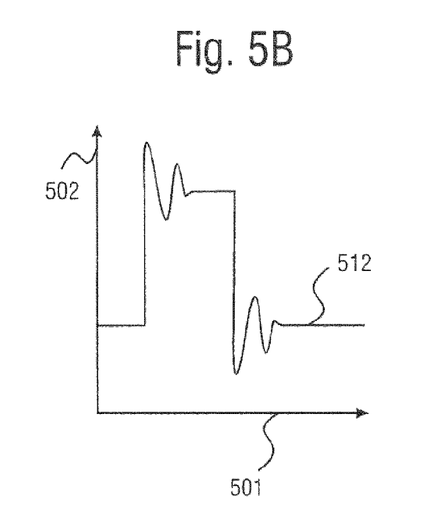

A drive current profile 511 is shown in FIG. 5A in a graph of current 502 versus time 501. Profile 511 is controlled via the drive current control loop 409 under a constant output voltage Vo 431 delivered by the SMPS 407 to the R, G, B LEDs 421-423 in branches 412 and 413 of the light source. Due to the specific circuit setup in the drive current control loo 409, edges of the current profiles may be quite sharp and may show damped transient oscillations (when the LEDs are just switched on, or just switched off). By contrast, without precaution, the drive current profiles in the LEDs would have the typical profile 512 shown in FIG. 5B, i.e. the current would exhibit characteristic undamped transient oscillations which could damage the LEDs. FIGS. 5A and 5B are intended to show profiles 511 and 512 at the same scale for current 502 and time 501.

Moreover, with a drive current profile 512, an excess of heat would be generated as the maximal amplitude of the corresponding transient drive current profile may be as high as about 1 A for a typical mean current level of about 2 A (here, the transient oscillation time being of about 100 ns, for pulse duration of about 100 µs). Thus, both dissipation in the drive current control loop 409 and setting by the control loop, via connection 416, of a convenient output voltage level Vo 431 delivered by the SMPS 407 contribute, together with appropriate illumination sequencing, to maintain heat production within the light source at an acceptable level while allowing illumination of the mark with an appropriate light intensity level for accurate light intensity measurement of light received by the light sensor from the mark (and further digital image processing by the processor of the camera). For example, with an input voltage Vi of about 24 V, the output voltage level Vo may be set to any value between 30 V and 48 V.

The controller 401 sends a set point signal to the camera 402 so that the camera opens its shutter to acquire an image of the mark 404 (during the measuring time interval) and simultaneously sends to the controller a synchronization signal to initialize control of the illumination light pulse to be delivered by the light source. After the red light pulse component emitted by LED(s) 421 of R type has excited the mark and the measuring time interval has lapsed, the controller 401 sends to the camera 402, which has acquired a digital image of the mark, a signal to close the shutter. The camera then sends to the controller 401 the acquired digital image for further image processing and decoding of the acquired digital image of the datamatrix/barcode.

In order to further reduce heat production at the light source, the on/off switching sequence of the LEDs may control a plurality of illuminations at least by one of the component light source (e.g. red type LED(s) 421), and the corresponding digital image acquisition operations (over measuring time intervals) by the camera 402.

Figure 6:
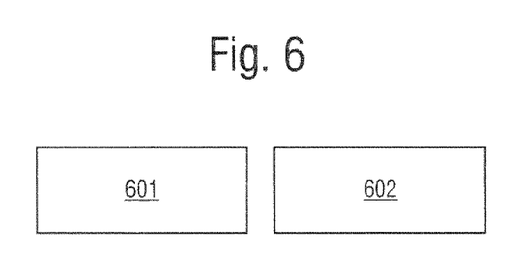
FIG. 6 shows a flow chart of a method embodiment of the present invention.

FIG. 6 shows a flow chart of method embodiments of the present invention. Method embodiments are directed at operating a reader operable to read a mark on a substrate, the reader comprising a power source, operable to deliver a variable drive current or voltage, a light source operable to illuminate said mark with a sequence of illumination light pulses of different wavelength spectra, an intensity of said illumination light pulses varying according to the delivered drive current or voltage, and a light sensor operable to measure an intensity of light received from said mark and to deliver a corresponding light intensity signal. Method embodiments the comprise a step 601 ("CONTROLLING") of controlling timings of said illumination light pulses according to a switching pattern and timings to acquire said light intensity signal for synchronizing acquisition of said light intensity signal with said sequence of illumination light pulses, and a step 602 ("ADJUSTING") adjusting a duty cycle of said switching pattern so as to maintain heat generation associated to each illumination light pulse below a given threshold value. Steps 601 and 602 can be performed subsequently, alternately, or simultaneously (e.g. by implementing parallel threads).

In general, the embodiments comprising image acquisition means allow for the control to compute a decay time of a luminescent material of said mark based on said image data and said timings. Specifically, information on a wavelength spectrum and timing of the light received from the mark can be employed. For example, controlling the illumination timings of the light pulses of the different illumination wavelength spectra and the image acquisition time allows for measuring a time response of any luminescence. For example, varying the distance (delay) between the illumination with one wavelength and corresponding image data acquisitions may provide information on the emission decay of any special (luminescent) component or material of the mark. A computed decay time may then be characteristic for a certain mark ink and can be, therefore, used to authenticate a mark, in the sense of retrieving information on whether or not a mark is composed of the correct (genuine) compounds.

Therefore, it is possible to use the (composite) light source according to the present embodiments, to acquire a global profile of luminescence light intensity I(t) emitted from a mark in order to calculate a decay-time value of the luminescent compound, whilst relying on power management by means of the sequenced illumination to avoid excess heat. The decay-time value is a physical characteristic of the luminescent compound which may serve to authenticate it. Generally, a high excitation light intensity is required for illuminating the mark, in order to cause emission of luminescent light of sufficient intensity to be measured (thus, heat generation may be a problem).

An advantage of the (composite) light source is therefore that it can be used for different types of luminescent pigments (materials), as it is possible to flash a LED having appropriate spectrum (in some cases, only a part of its spectrum may be used for excitation), or even with different LEDs of which spectra overlap in an excitation range. In case of fluorescent pigments, we generally have a first excitation pulse followed by a luminescent (decaying in intensity over time) emission light intensity is collected from the mark and analyzed for calculating a decay-time value (to be compared to a reference value), or to be compared (may be after normalization) with a reference intensity profile. This requires managing the illumination time and the subsequent light intensity acquisition time (the respective spectra being distinct). However, such decay-time measurement (authentication of the luminescent component of the material of the mark) may be combined with imaging of a pattern like a barcode (for example for decoding purpose).

According to a further embodiment of the invention, a mark reading device is a scanner for imaging a mark (M) from luminescence light emitted by a luminescent material of the mark, said luminescent material emitting said luminescence light within an emission wavelength range upon illumination with a composite illumination light pulse delivered during an illumination time interval T and having illumination light wavelength distribution within an illumination wavelength range WS=[λmin, λmax], said composite illumination light pulse being formed by a sequence of at least two distinct illumination light pulse components, each illumination light pulse component having a corresponding wavelength distribution within a sub-wavelength range WSj=[λjmin, λjmax] of said illumination wavelength range WS, said emission of luminescence light being due to excitation of the luminescent material by at least one of said two illumination light pulse components, comprises a power source (P); a light source (S) connected to said power source and operable to illuminate said luminescent material with said composite illumination light pulse within said illumination wavelength range WS when powered with drive current or drive voltage from the power source, during the illumination time interval T; an imaging unit comprising a light sensor operable to measure an intensity of the luminescence light received from said luminescent material, within said emission wavelength range, and deliver a corresponding luminescence intensity signal, the imaging unit being operable to form a digital image of the mark from intensity signals delivered by the light sensor; and a control unit operable to control said power source, light source, light sensor and imaging unit to acquire a digital image of the mark from luminescence intensity signals delivered over a measuring time interval Δt, wherein: said power source (P) is operable to deliver a variable drive current or drive voltage; said light source (S) is operable to produce said composite illumination light pulse with an intensity varying according to the delivered drive current or drive voltage; and said control unit is further operable to receive said luminescence intensity signal and control said power source to switch on/off according to a switching waveform said drive current, or drive voltage, delivered to the light source (S) so as to synchronize acquisition of said luminescence intensity by the light sensor with production of said at least one illumination (excitation) light pulse component by the light source (S) while adjusting a duty cycle of said switching waveform by means of a drive current control loop, or a drive voltage control loop, so as to maintain heat production within the light source below a given threshold value. In case the mark forms an encoded pattern, like a datamatrix for example, the above scanner may further comprise image processing means operable to decode a digital image acquired by the imaging unit.

According to a further embodiment of the invention, a mark reading device is a scanner for imaging a mark (M) from light reflected by a reflecting material of the mark, said material reflecting said light within an reflection wavelength range under illumination with a composite illumination light pulse delivered during an illumination time interval T and having illumination light wavelength distribution within an illumination wavelength range WS=[λmin, λmax], said composite illumination light pulse being formed by a sequence of at least two distinct illumination light pulse components, each illumination light pulse component having a corresponding wavelength distribution within a sub-wavelength range WSj=[λjmin, λjmax] of said illumination wavelength range WS, said reflection of light by the mark being due to reflection by the material of at least one of said two illumination light pulse components, comprises: a power source (P); a light source (S) connected to said power source and operable to illuminate said reflecting material with said composite illumination light pulse within said illumination wavelength range WS when powered with drive current or drive voltage from the power source, during the illumination time interval T; an imaging unit comprising a light sensor operable to measure an intensity of the light reflected and received from said reflecting material, within said reflection wavelength range, and deliver a corresponding reflected light intensity signal, the imaging unit being operable to form a digital image of the mark from intensity signals delivered by the light sensor; and a control unit operable to control said power source, light source, light sensor and imaging unit to acquire a digital image of the mark from reflected light intensity signals delivered over a measuring time interval Δt, wherein said power source (P) is operable to deliver a variable drive current or drive voltage; said light source (S) is operable to produce said composite illumination light pulse with an intensity varying according to the delivered drive current or drive voltage; and said control unit is further operable to receive said reflected light intensity signal and control said power source to switch on/off according to a switching waveform said drive current, or drive voltage, delivered to the light source (S) so as to synchronize acquisition of said reflected light intensity by the light sensor with production of said at least one illumination light pulse component by the light source (S) while adjusting a duty cycle of said switching waveform by means of a drive current control loop, or a drive voltage control loop, so as to maintain heat production within the light source below a given threshold value.

According to a further embodiment of the invention, a scanner for imaging a mark on a substrate comprises a power source, a light source connected to said power source and operable to illuminate said mark with a sequence of illumination light pulses of different wavelength spectra when powered with drive current or drive voltage from the power source, a light sensor operable to measure an intensity of light received from said mark, in response to an illumination sequence, within a wavelength range, and deliver a corresponding light intensity signal, and a control unit operable to control said power source, light source and light sensor to control the timings of said illumination light pulses and acquire light intensity signal from light received from the mark, wherein said power source is operable to deliver a variable drive current or drive voltage, said light source is operable to produce said illumination light pulses with an intensity varying according to the delivered drive current or drive voltage, and said control unit is further operable to receive said light intensity signal from the light sensor and control said power source to switch on/off according to a switching waveform said drive current, or drive voltage, delivered to the light source so as to synchronize acquisition of said light intensity by the light sensor with production of said sequence of illumination light pulses by the light source, and adjust a duty cycle of said switching waveform by means of a drive current control loop, or a drive voltage control loop, so as to maintain heat production associated to production of each illumination light pulse within the light source below a given threshold value.

Yet further, the disclosed embodiments may also serve to implement the aspect of a device for sequentially illuminating a plurality of marks having common optical properties, said device comprising a light source operable to illuminate the mark with repeated pulse sequences, a pulse sequence comprising a plurality of light pulses of different wavelength spectra, wherein pulse timings specify positions and durations of each pulse in one pulse sequence, and a control unit configured to control said pulse timings for each pulse sequence for controlling heat generation in said light source in accordance with said common optical properties.

Although detailed embodiments have been described, these only serve to provide a better understanding of the invention defined by the independent claims, and are not to be seen as limiting.

The invention claimed is:

1. A reader operable to read a mark on a substrate, the reader comprising:
   a power source, operable to deliver a variable drive current or voltage,
   a light source operable to illuminate said mark with a sequence of illumination light pulses of different wavelength spectra, an intensity of said illumination light pulses varying according to the delivered drive current or voltage;
   a light sensor operable to measure an intensity of light received from said mark and to deliver a corresponding light intensity signal; and
   a control unit operable to control said power source and light sensor to control timings of said illumination light pulses according to a switching pattern and timings to acquire said light intensity signal for synchronizing acquisition of said light intensity signal with said sequence of illumination light pulses,
   said control unit being further operable to adjust a duty cycle of said switching pattern so as to maintain heat generation associated to each illumination light pulse below a given threshold value,
   wherein the control unit is further configured to compute a decay time of a luminescent material of said mark based on said light intensity signal.

2. The reader of claim 1, wherein the light source comprises at least two component light sources, a first component light source operable to illuminate the mark with a light pulse of a first wavelength spectrum, and a second component light source operable to illuminate the mark with light pulse of a second wavelength spectrum.

3. The reader of claim 1, wherein said light sensor comprises an image acquisition unit configured for acquiring image data of the mark.

4. The reader of claim 3, wherein the control unit is configured to control an acquisition time of said image acquisition unit for controlling said timings to acquire said light intensity signal.

5. The reader of claim 4, wherein said acquisition time is an aperture opening time during which image data of the mark are acquired.

6. The reader of claim 1, wherein said decay time is computed also based on wavelength spectrum information related to the light received from the mark.

7. The reader of claim 1, wherein the mark comprises a luminescent material, and the control unit is configured to control said timings in accordance with emission characteristics of said luminescent material.

8. The reader of claim 1, wherein the mark comprises a plurality of luminescent materials, each having different emission characteristics, and the control unit is configured to control said timings in accordance with each emission characteristics of each luminescent material.

9. The reader of claim 1, wherein the control unit is configured to control any one of a delay between said timings, a position of one of said timings, and a duration of one of said light pulses.

10. The reader of claim 1, wherein said control unit adjusts the duty cycle of said switching pattern via a control loop.

11. The reader of claim 1, wherein said switching pattern is a switching waveform defining the switching on and off of said variable drive current or voltage.

12. The reader of claim 1, wherein the mark is any one of a one-dimensional barcode, a two-dimensional barcode, a datamatrix, and a security mark.

13. A method of operating a reader operable to read a mark on a substrate, the reader comprising:
   a power source, operable to deliver a variable drive current or voltage,
   a light source operable to illuminate said mark with a sequence of illumination light pulses of different wavelength spectra, an intensity of said illumination light pulses varying according to the delivered drive current or voltage;
   a light sensor operable to measure an intensity of light received from said mark and to deliver a corresponding light intensity signal;
   said method comprising:
   controlling timings of said illumination light pulses according to a switching pattern and timings to acquire said light intensity signal for synchronizing acquisition of said light intensity signal with said sequence of illumination light pulses,
   adjusting a duty cycle of said switching pattern so as to maintain heat generation associated to each illumination light pulse below a given threshold value, and
   computing a decay time of a luminescent material of said mark based on said light intensity signal.

14. The method of claim 13, wherein the light source comprises at least two component light sources, a first component light source operable to illuminate the mark with a light pulse of a first wavelength spectrum, and a second component light source operable to illuminate the mark with light pulse of a second wavelength spectrum.

15. The method of claim 13, further comprising acquiring image data of the mark.

16. The method of claim 15, further comprising controlling an acquisition time of said acquiring the image data for controlling said timings to acquire said light intensity signal.

17. The method of claim 16, wherein said acquisition time is an aperture opening time during which image data of the mark are acquired.

18. The method of claim 13, wherein said decay time is computed also based on wavelength spectrum information related to the light received from the mark.

19. The method of claim 13, wherein the mark comprises a luminescent material, and the control unit is configured to control said timings in accordance with emission characteristics of said luminescent material.

20. The method of claim 13, wherein the mark comprises a plurality of luminescent materials, each having different emission characteristics, and the control unit is configured to control said timings in accordance with each emission characteristics of each luminescent material.

21. The method of claim 13, further comprising controlling any one of a delay between said timings, a position of one of said timings, and a duration of one of said light pulses.

22. The method of claim 13, further comprising adjusting the duty cycle of said switching pattern via a control loop.

23. The method of claim 13, wherein said switching pattern is a switching waveform defining the switching on and off of said variable drive current or voltage.

24. The method of claim 13, wherein the mark is any one of a one-dimensional barcode, a two-dimensional barcode, a datamatrix, and a security mark.

25. A computer program comprising code, said code, when being executed on a processing resource, implementing a method of claim 13.

26. A computer program product comprising a tangible data carrier storing in a non-volatile manner the computer program of claim 25.

* * * * *